(12) United States Patent
Nakadate et al.

(10) Patent No.: US 8,794,400 B2
(45) Date of Patent: Aug. 5, 2014

(54) DAMPING FORCE ADJUSTABLE SHOCK ABSORBER

(75) Inventors: Takao Nakadate, Yamato (JP); Takashi Nezu, Yokohama (JP); Yohei Katayama, Kawasaki (JP); Shigeo Katayama, Yokohama (JP); Hiroyuki Yabe, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1225 days.

(21) Appl. No.: 12/385,130

(22) Filed: Mar. 31, 2009

(65) Prior Publication Data

US 2009/0242339 A1    Oct. 1, 2009

(30) Foreign Application Priority Data

| Mar. 31, 2008 | (JP) | 2008-93351 |
| Apr. 25, 2008 | (JP) | 2008-116213 |
| Feb. 24, 2009 | (JP) | 2009-40780 |

(51) Int. Cl.
     *F16F 9/34*      (2006.01)

(52) U.S. Cl.
     USPC .................. 188/266.6; 188/322.13

(58) Field of Classification Search
     USPC ........ 188/322.2, 161, 163, 266.1, 266.2, 267, 188/267.2, 266.6, 322.13, 315, 322.14
     See application file for complete search history.

(56) References Cited

U.S. PATENT DOCUMENTS

| 5,586,627 A | 12/1996 | Nezu et al. |
| 5,960,915 A * | 10/1999 | Nezu et al. ................. 188/266.6 |
| 6,182,805 B1 * | 2/2001 | Kashiwagi et al. ........ 188/266.6 |
| 6,860,370 B2 * | 3/2005 | Nakadate ................... 188/282.5 |
| 2007/0209892 A1 | 9/2007 | Masamura |

FOREIGN PATENT DOCUMENTS

| JP | 7-259918 | 10/1995 |
| JP | 9-151980 | 6/1997 |
| JP | 11-287281 | 10/1999 |
| JP | 2000-81072 | 3/2000 |
| JP | 2001-12534 | 1/2001 |
| JP | 2003-194133 | 7/2003 |
| JP | 2005-308178 | 11/2005 |

OTHER PUBLICATIONS

Notice of Reasons for Rejection (with English translation) issued Jan. 11, 2012 in corresponding Japanese Patent Application No. 2008-93351.
Japanese Office Action issued Dec. 12, 2012 in corresponding Japanese patent application No. 2009-040780, with English translation.
Office Action issued Aug. 28, 2013 in corresponding Japanese patent application No. 2009-040780.

* cited by examiner

*Primary Examiner* — Vishal Sahni
(74) *Attorney, Agent, or Firm* — Wenderoth, Lind & Ponack, LLP (57) ABSTRACT

A damping force adjustable hydraulic shock absorber, in which response delay of a pressure control valve and self-excited vibration of a valve body can be prevented. A damping force is generated by controlling an oil flow between an annular oil passage (21) and a reservoir (4) generated by sliding movement of a piston in a cylinder with use of a back-pressure type main valve (27) and a pressure control valve (28). The damping force is directly generated by the pressure control valve, and valve-opening pressure of the main valve is adjusted by adjusting an inner pressure of a back-pressure chamber. In the pressure control valve, a valve spring is disposed between a valve body and a plunger. A mass of the valve body is sufficiently less than that of the plunger, and a spring stiffness of the valve spring is higher than that of a plunger spring.

11 Claims, 12 Drawing Sheets

DAMPING FORCE ADJUSTABLE SHOCK ABSORBER

BACKGROUND OF THE INVENTION

1. Technical Field

The present invention relates to a damping force adjustable shock absorber mounted on, for example, a suspension apparatus of a vehicle such as an automobile.

2. Description of the Related Art

Generally, in a damping force adjustable shock absorber mounted on a suspension apparatus of an automobile, a piston coupled to a piston rod is slidably fitted in a cylinder sealingly containing oil, whereby the inside of the cylinder is divided into two chambers, and a damping force is generated by controlling an oil flow generated by a sliding movement of the piston in the cylinder with use of a damping force generating mechanism comprising an orifice, a disk valve and others. In addition, the damping force is adjusted by changing flow resistance of the damping force generating mechanism with use of, for example, a flow control valve or a pressure control valve.

As this kind of damping force adjustable shock absorber, for example, Japanese Patent Public Disclosure No. 2001-12534 discloses a shock absorber in which a back-pressure chamber is formed behind a disk valve serving as a damping force generating mechanism. In this invention, the back-pressure chamber is in communication with an upstream-side cylinder chamber through a fixed orifice, and also is in communication with a downstream-side cylinder chamber through a pressure control valve (solenoid valve).

Due to this configuration, it is possible to directly adjust flow resistance against an oil flow with use of the pressure control valve, and also possible to adjust a valve-opening pressure of the disk valve by adjusting the inner pressure of the back-pressure chamber, whereby it is possible to broaden the adjustable range of the damping force characteristics.

However, the damping force adjustable shock absorber as disclosed in Japanese Patent Public Disclosure No. 2001-12534 has the following drawbacks. For example, if the damping force adjustable shock absorber is mounted on a suspension control apparatus of a vehicle such as an automobile, and performs a damping force control by receiving a control signal from a controller according to a running condition of the vehicle, response delay may occur due to, for example, the inertia of the plunger of the pressure control valve (solenoid valve), leading to overshoot in the damping force control. In addition, abnormal noises may be generated due to self-excited vibration of the valve body of the pressure control valve.

SUMMARY OF THE INVENTION

The present invention has been contrived in consideration of the above-mentioned circumstances, and an object thereof is to provide a damping force adjustable shock absorber in which it is possible to prevent response delay of a pressure control valve and occurrence of self-excited vibration of a valve body.

To achieve the forgoing and the other objects, the present invention is to provide a damping force adjustable shock absorber, comprising: a cylinder sealingly containing fluid; a piston slidably fitted in the cylinder; a piston rod having one end coupled with the piston and the other end extending to an outside of the cylinder; and a pressure control valve operable to generate a damping force by controlling a fluid flow generated by a sliding movement of the piston in the cylinder, the pressure control valve having an adjustable valve-opening pressure. In this damping force adjustable shock absorber, the pressure control valve comprises a valve body, a plunger for adjusting the valve-opening pressure by urging the valve body to one side in an axial direction, a valve spring disposed between the valve body and the plunger, and a main spring for urging the plunger or the valve body to the other side of the axial direction. Further, in this damping force adjustable shock absorber, a mass of the valve body is less than a mass of the plunger, and a spring stiffness of the valve spring is higher than a spring stiffness of the main spring.

According to the damping force adjustable shock absorber of the present invention, it is possible to improve the responsiveness of the valve body and therefore to prevent response delay in a damping force control. In addition, since the natural frequency of the valve body can be set to a high value, it is possible to prevent occurrence of self-excited vibration.

DETAILED DESCRIPTION OF THE INVENTION

Figure 4:
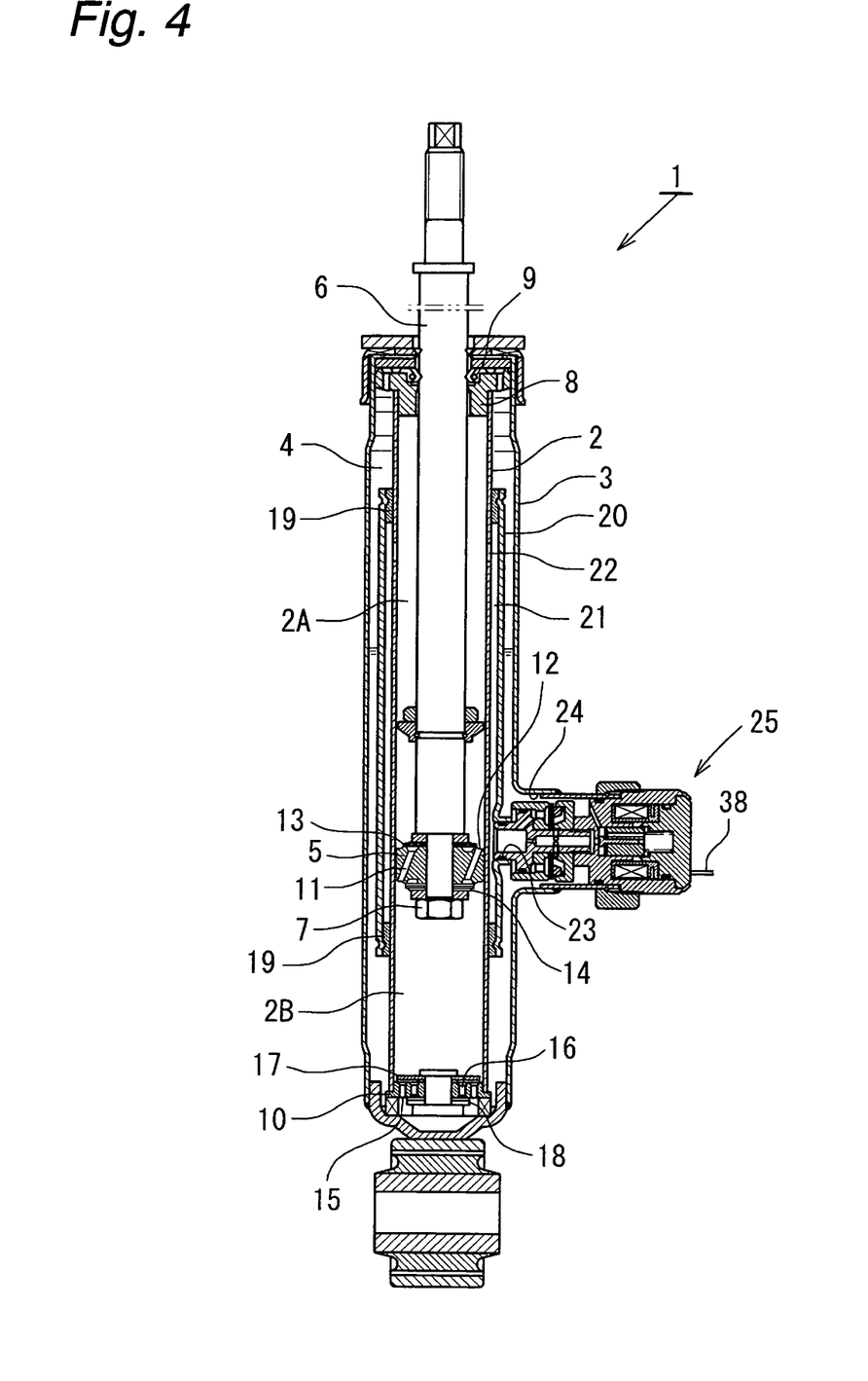
FIG. 4 is a vertical cross-sectional view of the damping force adjustable hydraulic shock absorber according to the first embodiment of the present invention.

A first embodiment of the present invention will now be described with reference to the accompanying drawings. As shown in FIG. 4, a damping force adjustable hydraulic shock absorber 1 (damping force adjustable shock absorber) according to the first embodiment has a double-cylinder structure including a cylinder 2 disposed in an outer cylinder 3, and a reservoir 4 is formed between the cylinder 2 and the outer cylinder 3. A piston 5 is slidably fitted in the cylinder 2, and the inside of the cylinder 2 is separated into two chambers, a cylinder upper chamber 2A and a cylinder lower chamber 2B by the piston 5. One end of a piston rod 6 is coupled to the piston 5 by a nut 7, and the other end of the piston rod 6 extends to the outside of the cylinder 2 through the cylinder upper chamber 2A, and a rod guide 8 and an oil seal 9 attached to the upper ends of the cylinder 2 and the outer cylinder 3. A base valve 10 for separating the cylinder lower chamber 2B and the reservoir 4 is disposed at the lower end of the cylinder 2.

Oil passages 11 and 12 for connecting the cylinder upper and lower chambers 2A and 2B are formed at the piston 5. A check valve 13 is disposed at the oil passage 11 for allowing only an oil flow from the cylinder lower chamber 2B side to the cylinder upper chamber 2A side. A disk valve 14 is disposed at the oil passage 12. When an oil pressure in the cylinder upper chamber 2A side reaches a predetermined pressure, the disk valve 14 opens and relieves the oil pressure into the cylinder lower chamber 2B side.

Oil passages 15 and 16 for connecting the cylinder lower chamber 2B and the reservoir 4 are formed in the base valve 10. A check valve 17 is disposed at the oil passage 15 for allowing only an oil flow from the reservoir 4 side into the cylinder lower chamber 2B side. A disk valve 18 is disposed at the oil passage 16. When an oil pressure in the cylinder lower chamber 2B reaches a predetermined pressure, the disk valve 18 opens and releases the oil pressure into the reservoir 4. The cylinder 2 sealingly contains oil, and the reservoir 4 sealingly contains oil and gas.

A separator tube 20 is disposed around the cylinder 2 with seal members 19 disposed between the separator tube and the cylinder at the upper and lower ends of the separator tube 20, whereby an annular oil passage 21 is formed between the cylinder 2 and the separator tube 20. The annular oil passage 21 is in communication with the cylinder upper chamber 2A via an oil passage 22 formed through the side wall of the cylinder 2 in the vicinity of the upper end of the cylinder 2. An opening 23 having a small diameter is formed through the side wall of the separator tube 20. An opening 24 having a large diameter is formed through the side wall of the outer cylinder 3 so as to be substantially concentric with the opening 23. A damping force generating mechanism 25 is attached to the opening 24 on the side wall of the outer cylinder 3.

Figure 1:
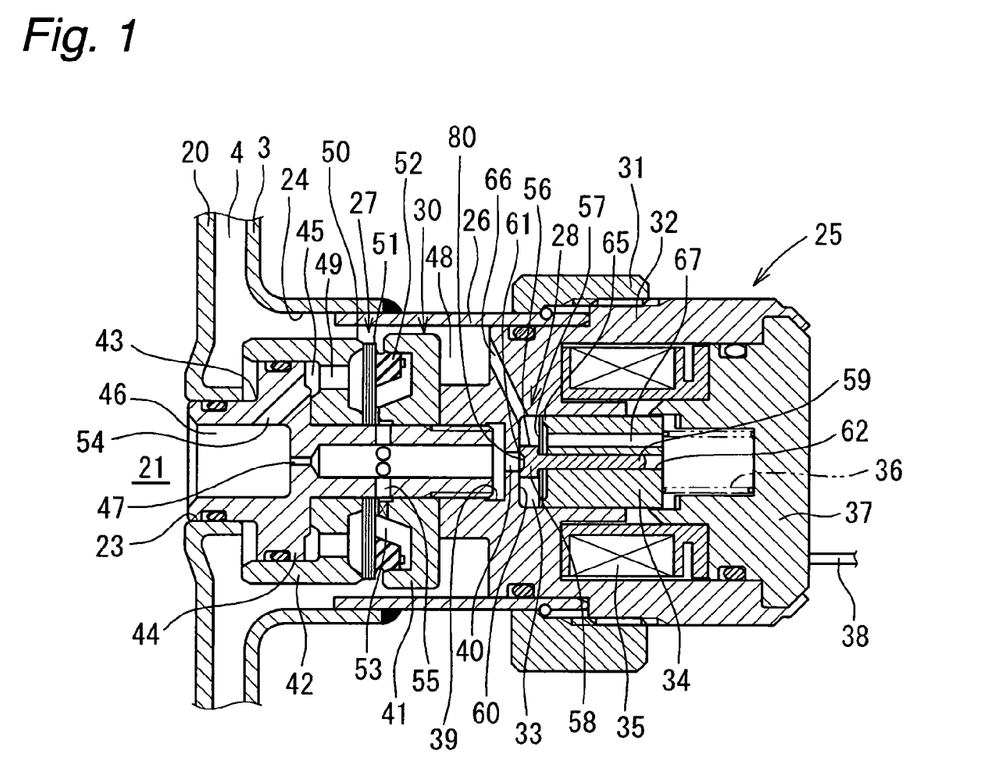
FIG. 1 is an expanded vertical cross-sectional view illustrating a damping force generating mechanism of a damping force adjustable hydraulic shock absorber according to a first embodiment of the present invention.

The damping force generating mechanism 25 will now be described with reference to FIGS. 1 to 3. As shown in FIG. 1, one end of a cylindrical case 26 is inserted in the opening 24 and fixed thereto by welding. A valve unit 30, which is formed by integrally joining a pilot type (back-pressure type) main valve 27 and a pressure control valve 28 (solenoid valve), is inserted in the case 26 and fixed thereto by a nut 31.

The valve unit 30 comprises a solenoid case 32 fixed to the case 26 by the nut 31. A guide bore 33 is formed at the outer end of the solenoid case 32 along the axial direction. A plunger 34 is slidably guided in the guide bore 33. Further, a coil 35 (solenoid), and a plunger spring 36 (compression coil spring) as a main spring are contained in the guide bore 33, and a core 37 is fitted in the guide bore 33 and fixed to the solenoid case 32 by caulking, whereby the coil 35 is fixed therein and one end of the plunger spring 36 is supported. A lead wire 38 for application of an electric current is connected to the coil 35 and extends to the outside of the damping force mechanism 25.

A passage bore 39 is formed at the inner end of the solenoid case 32 so as to be concentric with the guide bore 33. The guide bore 33 and the passage bore 39 are in communication with each other through a port 40 having a small diameter. A bottomed cylindrical guide member 41 and a bottomed cylindrical valve member 42 are disposed in this order at the inner end of the solenoid case 32. One end of a stepped cylindrical passage member 43 is inserted through the bottoms of the valve member 42 and the guide member 41, and the tip thereof is screwed in the passage bore 39, whereby they are integrally coupled. A large diameter portion 44 formed at an intermediate position of the passage member 43 is fitted in the valve member 42, whereby a chamber 45 is formed in the valve member 42. The other end of the passage member 43 is fitted in the opening 23 of the separator tube 20, and one end of an axially extending oil passage 46 in the passage member 43 is in communication with the annular oil passage 21. A fixed orifice 47 (introducing orifice) is formed at an intermediate position of the axially extending oil passage 46.

A plurality of oil passages 49 are formed at the bottom of the valve member 42, and an annular valve seat 50 is formed in a protruding manner on the outer circumferential side of the oil passage 49 at the outer end face of the bottom of the valve member 42. A disk valve 51 (main valve) is made by stacked valve disks, and the inner circumferential portion thereof is clamped between the valve member 42 and the guide member 41, and the outer circumferential portion thereof is seated on the valve seat 50. An annular seal member 52 is fixedly attached to the back surface of the disk valves 51. The seal member 52 is liquid-tightly and slidably fitted to the inner circumferential surface of the cylindrical portion of the guide member 41, whereby a back-pressure chamber 53 is formed in the guide member 41. The disk valves 51 are deflected by receiving an oil pressure in the oil passage 49 to move away from the valve seat 50 (the main valve opens), and connect the chamber 45 in the valve member 42 to a chamber 48 (which is in communication with the reservoir 4 through the opening 24 of the outer cylinder 3) in the case 26. The combination of the disk valves 51 and the back-pressure chamber 53 embodies a pilot type (back-pressure type) damping valve, and the inner pressure of the back-pressure chamber 53 acts on the disk valves 51 in the valve-closing direction. The upstream side of the fixed orifice 47 of the axially extending oil passage 46 of the passage member 43 is in communication with the chamber 45 in the valve member 42 via an oil passage 54 formed through the passage member 43, and the downstream side of the fixed orifice 47 is in communication with the back-pressure chamber 53 via an radially extending oil passage 55.

A valve body 56 for opening and closing the port 40 is axially movably supported at the tip of the plunger 34. The valve body 56 is elastically supported by a valve spring 57 (leaf spring). The valve body 56 has a stepped shape comprising a large-diameter head portion 58 and a small-diameter shaft portion 59. An annular seat portion 61 is formed in a protruding manner at the head portion 58. The annular seat portion 61 is adapted to be seated on a seat surface 60 formed on the surrounding portion around the port 40 in the guide bore 33. The shaft portion 59 is slidably inserted in a guide bore 62 formed through the plunger 34 at the center of the plunger 34.

At the head portion 58 of the valve body 56, a concave portion 80 having a substantially same diameter as that of the port 40 is formed adjacent to the inner circumferential portion of the annular seat portion 61 so as to face the port 40, whereby a radial dimension of the tip of the annular seat portion 61 to be seated on the seat surface 60 is sufficiently small.

Figure 2:
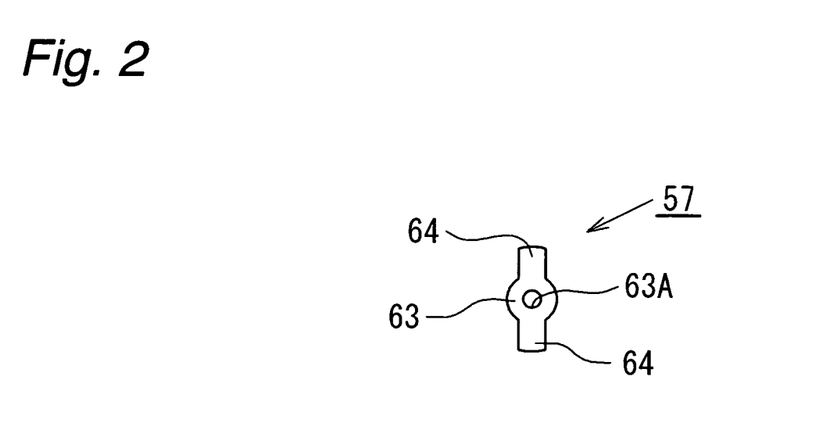
FIG. 2 is a front view illustrating a valve spring of a pressure control valve of the damping force generating mechanism shown in FIG. 1.
Figure 3:
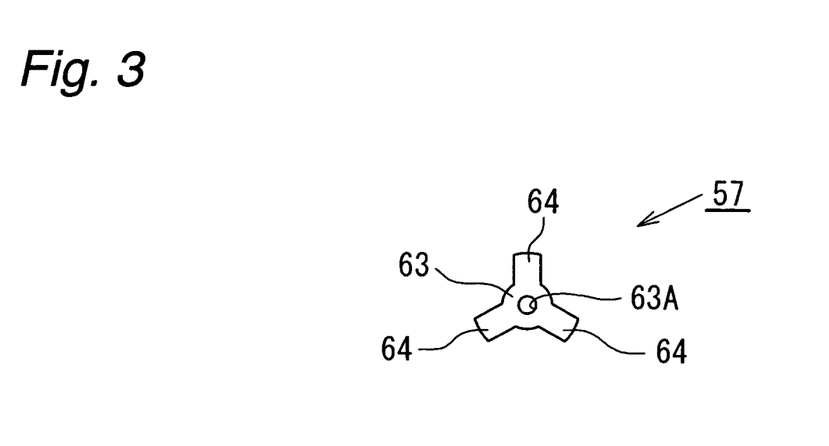
FIG. 3 is a front view illustrating an exemplary variation of the valve spring of the pressure control valve of the damping force generating mechanism shown in FIG. 1.

As shown in FIG. 2, the valve spring 57 includes an abutment portion 63 having a substantially circular shape, and a valve bore 63A formed through the abutment portion 63, and a leg portion 64 extending from the abutment portion 63 along the diameter of the plunger 34. The shaft portion 59 of the valve body 56 is inserted through the valve bore 63A, and the head portion 58 thereof abuts against the abutment portion 63. The outer end portion of the leg portion 64 abuts against an annular spring receiving portion 65 protrudingly formed along the outer circumferential edge of the tip of the plunger 34, and is axially movably and elastically supported by the plunger 34. As shown in FIG. 3, the valve spring 57 may have a plurality of leg portions 64 extending radially (in the embodiment shown in FIG. 3, three leg portions 64 extend equiangularly).

The port 40 and the valve body 56 constitute the pressure control valve 28. The valve body 56 opens when a pressure of oil in the port 40 reaches a predetermined pressure, and the valve-opening pressure can be adjusted according to the spring force of the plunger spring 36, and a thrust force of the solenoid, i.e., an electric current applied to the coil 35. The guide bore 33 is in communication with the chamber 48 via an oil passage 66 formed through the solenoid case 32. A restriction passage 67 is formed through the plunger 34 so as to connect the chambers formed at the both ends of the plunger 34, whereby an appropriate damping force is generated to be applied to a movement of the plunger 34.

The spring stiffness of the valve spring 57 is higher than that of the plunger spring 36, and the mass of the valve boy 56 is sufficiently smaller than that of the plunger 34. The natural frequency of the valve body 56 is set to a sufficiently high value.

The function of the present embodiment configured as mentioned above will now be described. The damping force adjustable hydraulic shock absorber 1 is coupled to a suspension apparatus of a vehicle such as an automobile such that the cylinder 2 side is coupled to the unsprung side and the piston rod 6 side is coupled to the sprung side. Further, the lead wire 38 of the coil 35 is connected to a controller (not shown).

During an extension stroke of the piston rod 6, the oil flows as follows. A movement of the piston 5 in the cylinder 2 cause the check valve 13 of the piston 5 to close. Before the disk valve 14 opens, the oil in the cylinder upper chamber 2A is pressurized, and flows through the oil passage 22, the annular oil passage 21, and the opening 23 of the separator tube 20 into the axially extending oil passage 46 of the damping force generating mechanism 25. Then, before the disk valve 51 of the main valve 27 opens, the oil flows through the fixed orifice 47, the passage bore 39, and the port 40. The oil flow causes the valve body 56 of the pressure control valve 28 to open. Then, the oil flows through the guide bore 33, the oil passage 66, and the chamber 48 into the reservoir 4. Once the pressure in the chamber 45 of the valve member 42 reaches the valve-opening pressure of the disk valves 51, the disk valve 51 opens, and the oil flows from the upstream of the fixed orifice 47 of the axially extending oil passage 46 through the oil passage 54, the oil chamber 45, and the oil passage 49 into the chamber 48.

At this time, the oil transferred into the reservoir 4 by the movement of the piston 5 acts from the reservoir 4 so as to cause the check valve 17 of the base valve 10 to open, and flows into the cylinder lower chamber 2B. Once the pressure in the cylinder upper chamber 2A reaches the valve-opening pressure of the disk valve 14 of the piston 5, the disk valve 14 opens, and the pressure in the cylinder upper chamber 2A is relieved into the cylinder lower chamber 2B, whereby an excessive increase in the pressure in the cylinder upper chamber 2A is prevented.

During a compression stroke of the piston rod 6, the oil flows as follows. A movement of the piston 5 in the cylinder 2 causes the check valve 13 of the piston 5 to open, and the check valve 17 of the oil passage 15 of the base valve 10 to close. Before the disk valve 18 opens, the oil in the piston lower chamber 2B flows into the cylinder upper chamber 2A, and, by entry of the piston rod 6 into the cylinder 2, some of the oil in the cylinder upper chamber 2A flows from the cylinder upper chamber 2A into the reservoir 4 via the same route as the above-mentioned route in the extension stroke. Once the pressure in the cylinder lower chamber 2B reaches the valve-opening pressure of the disk valve 18 of the base valve 10, the disk valve 18 opens, and the pressure in the cylinder lower chamber 2B is relieved into the reservoir 4, whereby an excessive increase in the pressure in the cylinder lower chamber 2B is prevented.

In this way, during both of extension and compression strokes of the piston rod 6, a damping force is generated by the fixed orifice 47 and the pressure control valve 28 before the main valve 27 opens (low speed region of piston speed), while a damping force is generated according to the opening degree of the main valve 27 after the main valve 27 opens (high speed region of piston speed). The valve-opening pressure of the pressure control valve 28 is adjusted by an electric current applied to the coil 35, which realizes a direct control of a damping force regardless of piston speed. At this time, the valve-opening pressure of the main valve 27 can be simultaneously adjusted, since the inner pressure in the back-pressure chamber 53 is adjusted according to the valve-opening pressure of the pressure control valve 28, whereby the adjustable range of the damping force characteristics can be broadened.

Since in the pressure control valve 28, the spring stiffness of the valve spring 57 is set to a higher value than that of the plunger spring 36, the mass of the valve body 56 is sufficiently less than that of the plunger 34, and the natural frequency of the valve body 56 is set to a sufficient high value, it is possible to reduce the possibility of occurrence of response delay which otherwise could be caused by the inertia of the plunger 34, and it is possible to prevent the overshoot phenomenon to perform an appropriate damping force control. When the pressure in the port 40 suddenly increases, the valve spring 57 is deflected and only the lightweight valve body 56 retreats so that the valve 28 opens, and then the plunger 34 also retreats according to the retreat movement of the valve body 56. Therefore, it is prevented that the pressure in the back-pressure chamber 53 would excessively increase due to delay of valve opening of the pressure control valve 28, and it is possible to perform a stable damping force control. In addition, since the natural frequency of the valve body 56 is set to a sufficiently high value, it is prevented that abnormal noises would be generated and a damping force would be destabilized due to self-excited vibration.

Further, in the pressure control valve 28, the annular seat portion 61 is formed at the head portion 58 of the valve body 56, whereby it is possible to provide a large flow passage area when the valve opens, and therefore it is possible to broaden the adjustable range of the soft-side damping force. On the other hand, for example, the invention disclosed in Japanese Patent Public Disclosure No. Hei 7-259918 employs a needle valve as a pressure control valve. In this invention, it is impossible to provide a large flow passage area when the valve opens, and therefore it is difficult to generate a sufficiently small soft-side damping force.

Figure 12:
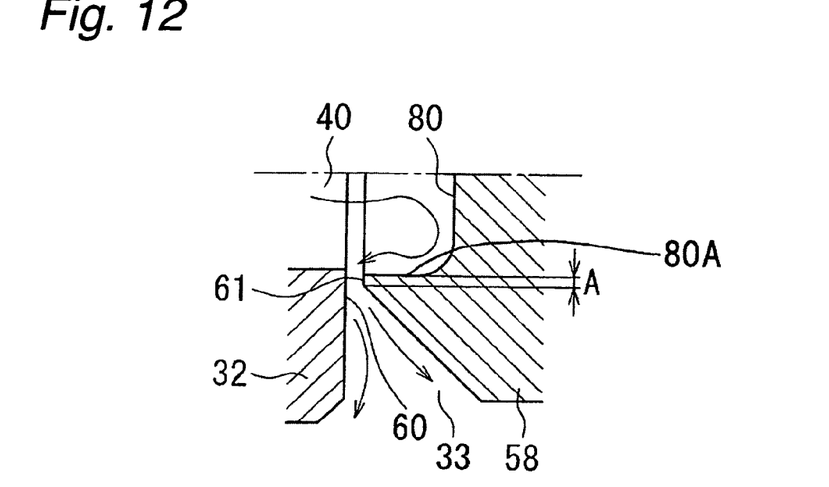
FIG. 12 is an expanded vertical cross-sectional view illustrating a seat surface and a seat portion of the pressure control valve of the damping force adjustable hydraulic shock absorber according to the first embodiment of the present invention.

Referring to FIG. 12, in the pressure control valve 28, a fluid force in the valve-closing direction acts on the valve body 56 by a high speed oil flow entering from the port 40 into guide bore 33 when the valve opens. Due to this fluid force, several problems may occur. For example, the valve-opening pressure of the valve body 56 increases so that the soft-side damping force becomes large. Further, the fluid force is changed according to a piston speed and an opening degree of the valve body 56 so that the damping force control by the pressure control valve 28 is destabilized. Furthermore, the valve body 56 vibrates so that the chattering phenomenon occurs. Therefore, if a disk valve is employed as a pressure control valve as disclosed in, for example, Japanese Patent Public Disclosure No. Hei 11-287281, such a fluid force may adversely affect the damping force characteristics.

On the other hand, in the present embodiment, due to the formation of the concave portion 80 adjacent the inner circumferential portion of the annular seat portion 61, it is possible to sufficiently reduce a pressure-receiving area A of the seat portion 61 on which the fluid force acts. Therefore, the influence of the fluid force can be reduced, and a sufficiently small soft-side damping force can be generated. In addition, a stable damping force control by the pressure control valve 28 can be performed. It is preferable to form the concave portion 80 adjacent the inner circumferential portion of the annular seat portion 61 as mentioned above. However, for example, a gentle taper portion may be formed so as to taper from the annular seat portion 61 to the bottom of the concave portion 80, which is also effective for preventing problems such as occurrence of the chattering phenomenon, compared to using a disk valve without inventive means.

Figure 13:
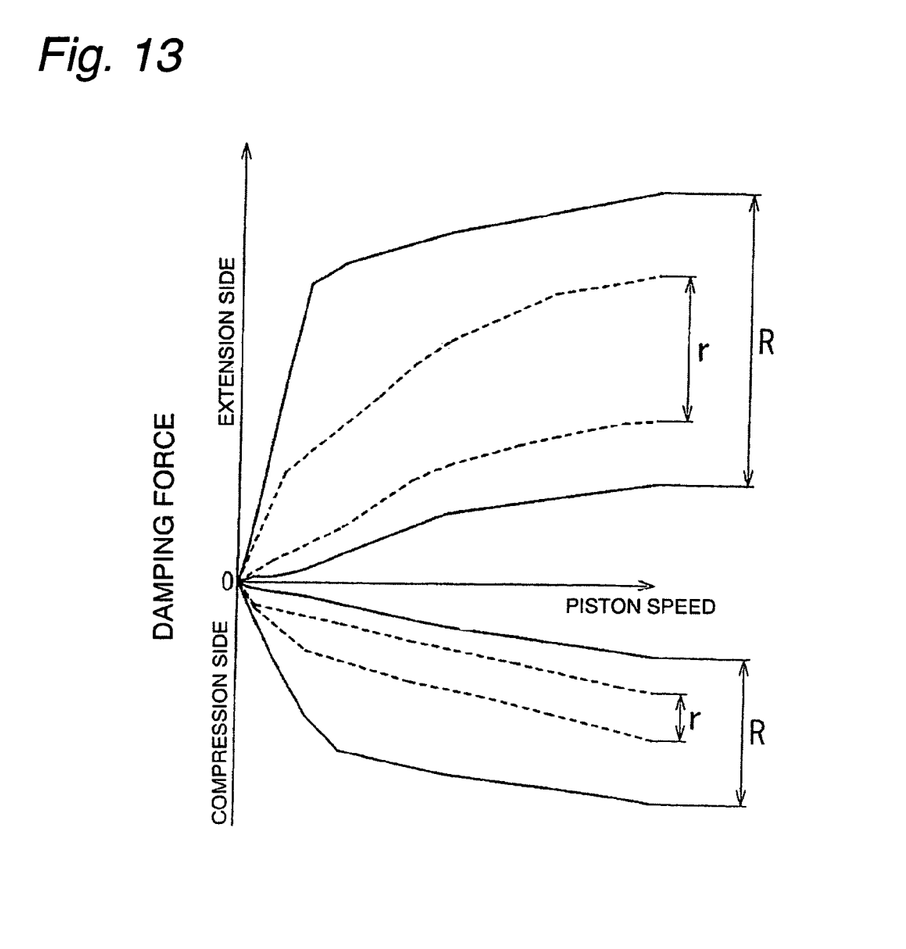
FIG. 13 is a graph illustrating the damping force characteristics of the damping force adjustable hydraulic shock absorber according to the first embodiment of the present invention.

FIG. 13 illustrates the damping force characteristics of the damping force adjustable hydraulic shock absorber 1. As shown in FIG. 13, the damping force adjustable hydraulic shock absorber 1 has a wider adjustable range R of the damping force characteristics from the soft-side to the hard-side, than an adjustable range r of a conventional shock absorber.

In the present embodiment, the valve unit 30 comprising the main valve 27 and the pressure control valve 28, which are integrally coupled to each other, is disposed in the case 26 at the lateral of the cylinder 2, and a damping force is generated by controlling an oil flow between the annular oil passage 21 and the reservoir 4. However, the valve unit 30 may be disposed in the piston 5 or at the base valve 10, and a damping force may be generated by appropriately controlling an oil flow in the oil passage.

A second embodiment of the present invention will now be described with reference to FIGS. 5 to 11. In the following description, like components are denoted by like reference numerals as of the first embodiment, and only components and features different or absent from the first embodiment will be described in detail.

Figure 5:
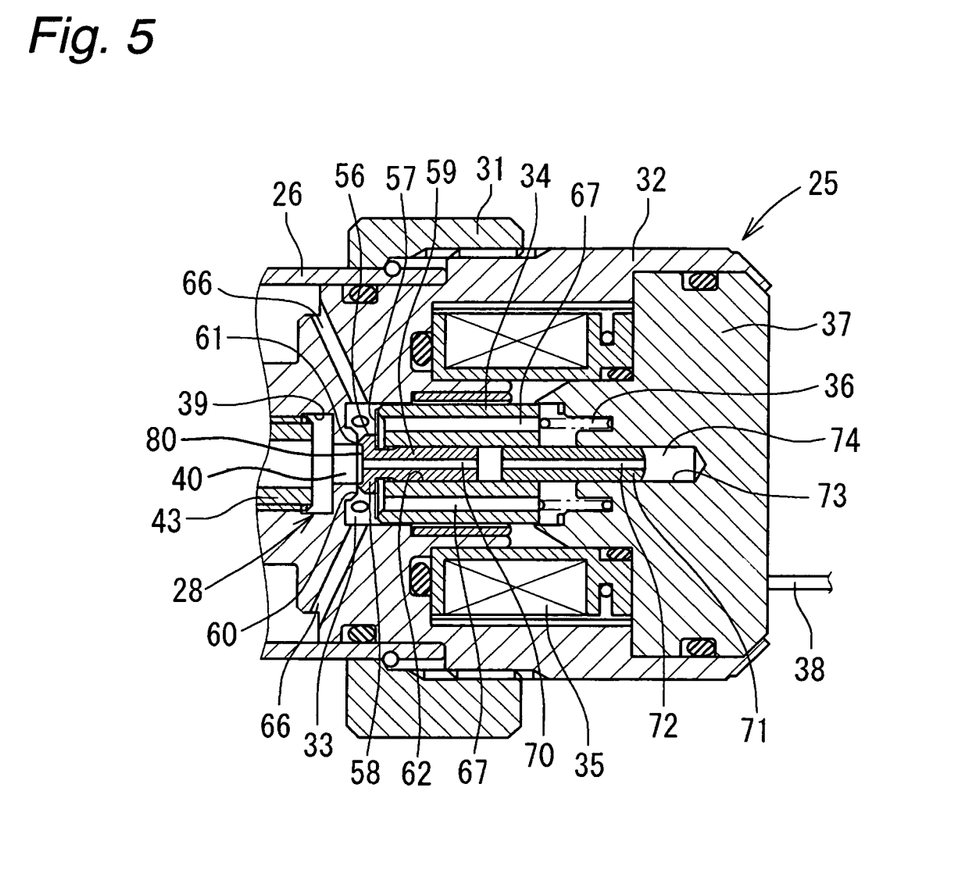
FIG. 5 is an expanded vertical cross-sectional view illustrating a pressure control valve of a damping force generating mechanism of a damping force adjustable hydraulic shock absorber according to a second embodiment of the present invention.
Figure 6:
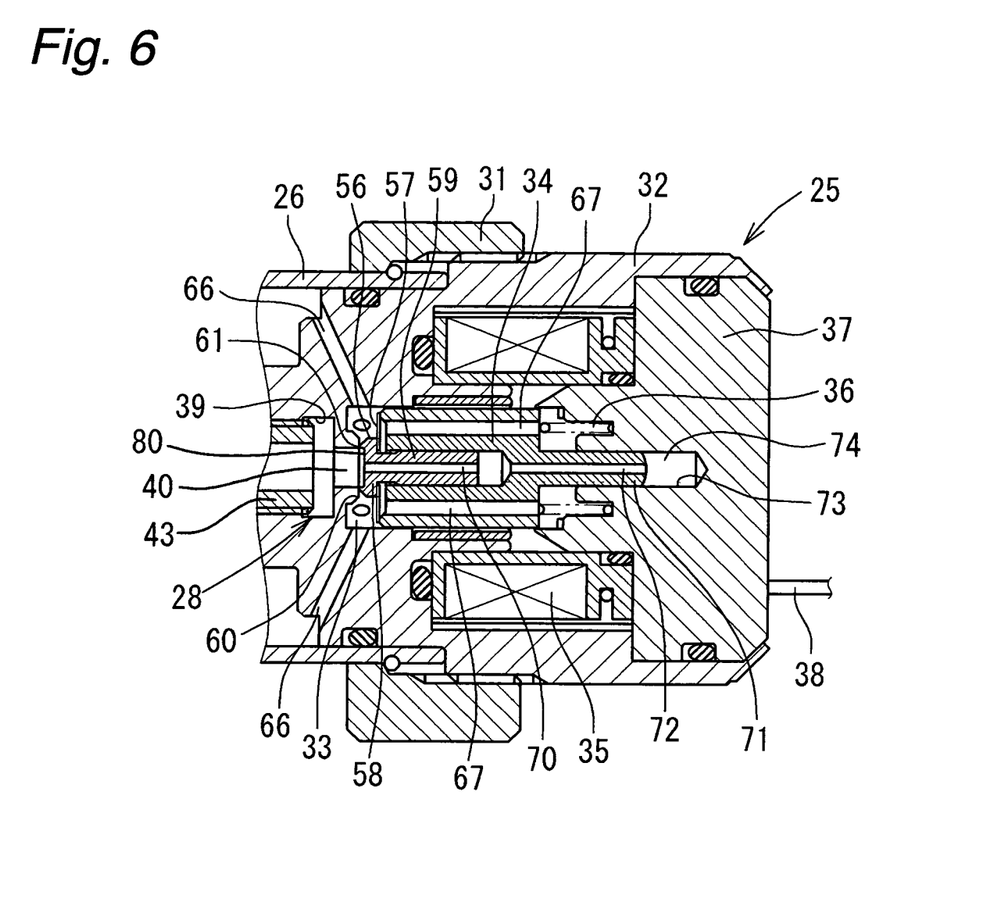
FIG. 6 is an expanded vertical cross-sectional view illustrating a pressure control valve according to a variation of the second embodiment of the present invention.

FIG. 5 is an enlarged view of a pressure control valve 28 of a damping force generating mechanism 25 which is an important part of the second embodiment. As shown in FIG. 5, in the second embodiment, a port 40, a head portion 58 of a valve body 56, a shaft portion 59, and a seat portion 61 constituting the pressure control valve 28 respectively have larger diameters than those in the first embodiment. Further, the valve body 56 includes a valve body communication passage 70 formed through the valve body 56 along the axial direction thereof. A tube-shaped guide pin 71 is press-fittedly fixed at the rear end of a guide bore 62 of a plunger 34, and protrudes from the rear of the plunger 34. The guide pin 71 includes a communication passage 72 formed through the guide pin 71 along the axial direction thereof. A guide bore 73 is formed at a core 37 so as to face the guide pin 71. The guide pin 71 is slidably and liquid-tightly inserted in the guide bore 73, and a valve body back-pressure chamber 74 is defined in the guide bore 73.

When the pressure control valve 28 is closed, i.e., when the seat portion 61 of the valve body 56 is seated on a seat surface 60, the valve body back-pressure chamber 74 is in communication with the port 40 via the communication passage 72 of the guide pin 71, the guide bore 62 of the plunger 34, and the valve body communication passage 70 of the valve body 56. Therefore, the pressure-receiving area of the valve body 56 to the port 40 is the area resulting from subtraction of the cross-section area of the shaft portion 59 from the area of the inner portion of the seat 61. In the valve body 56, a pressure-receiving area to the valve body back-pressure chamber 74 side is smaller than the pressure-receiving area A to the upstream side As a result, in the valve body 56, it is possible to adjust the pressure-receiving area to the port 40 by adjusting not only the diameter of the seat portion 61 but also the diameter of the shaft portion 59. Therefore, flexibility of setting of the valve-opening characteristics of the pressure control valve 28, and therefore flexibility of setting of the damping force characteristics of the damping force generating mechanism 25 can be enhanced.

For example, even if the soft-side damping force when the valve body 56 opens is set so as to be sufficiently small by providing the port 40 having a large diameter, it is possible to have a small area as the pressure-receiving area of the valve body 56 by providing the shaft portion 59 having a large diameter. Therefore, without the need of a large thrust force of the plunger 34, the valve-opening pressure of the pressure control valve 28 can be increased so that a large hard-side damping force can be achieved.

In the present embodiment, as shown in FIG. 12, the valve body 58 of the pressure control valve 28 has a shape such that the pressure-receiving area A of the front end of the seat portion 61, and the influence of the fluid force thereto can be sufficiently reduced, as to the fluid force generated by an oil flow entering from the port 40 into the guide bore 33. In particular, a side wall 80A of the concave portion 80 at the inner circumferential portion of the seat portion 61 is substantially perpendicular to the seat surface 61, and the outer circumferential side of the seat portion 61 tapers. As a result, the influence of the fluid force can be effectively reduced, and the soft-side damping force can become sufficiently small. In addition, a stable damping force control with use of the pressure control valve 28 can be realized.

Variations of the above-mentioned second embodiment will now be described with reference to FIGS. 6 to 11. A difference between the variation shown in FIG. 6 and the second embodiment is that, in the variation of FIG. 6, the guide pin 71 is integrally formed with the plunger 34, whereby the number of the required components can be reduced.

Figure 7:
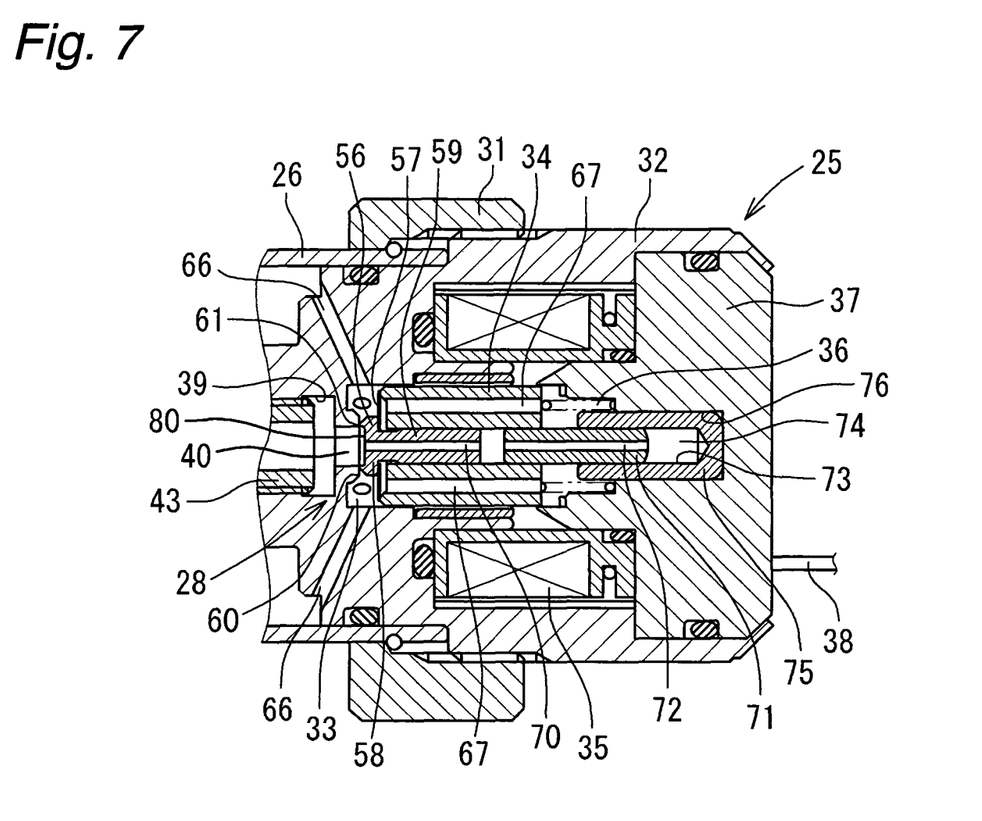
FIG. 7 is an expanded vertical cross-sectional view illustrating a pressure control valve according to another variation of the second embodiment of the present invention.

A difference between the variation shown in FIG. 7 and the second embodiment is that, in the variation of FIG. 7, a bottomed cylindrical guide member 75 is provided as a separate component from a core 37 (solenoid case). The guide member 75 includes a guide bore 73, and is inserted in an attachment bore 76 formed in the core 37. The bottom of the guide member 75 abuts against the bottom of the attachment bore 76, whereby the guide member 75 is axially fixed. The guide member 75, as a back-pressure chamber defining member, defines a valve body back-pressure chamber 74 outside the plunger 34. In addition, the guide member 75 is slightly radially movable in the attachment bore 76, whereby the requirement for concentric precision between the guide pin 71 and the guide bore 73 can be relaxed. The guide member 75 may be used in the variation shown in FIG. 6.

Figure 8:
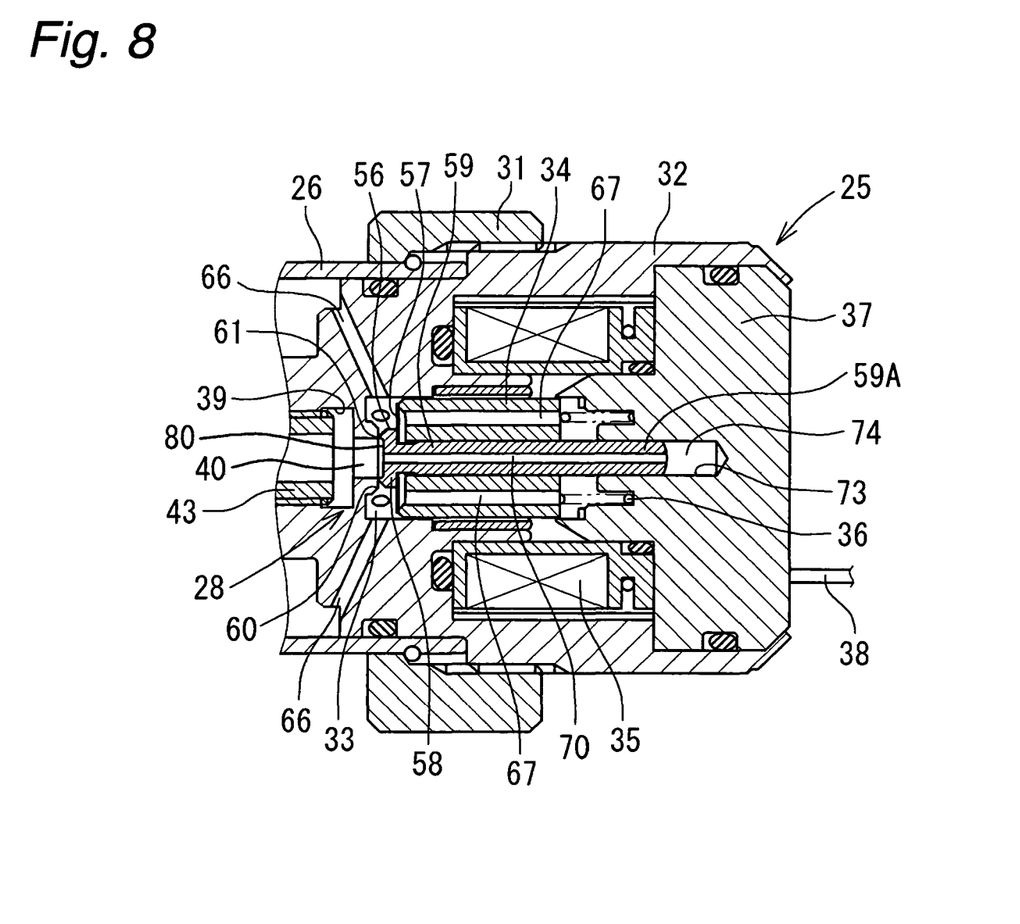
FIG. 8 is an expanded vertical cross-sectional view illustrating a pressure control valve according to still another variation of the second embodiment of the present invention.
Figure 9:
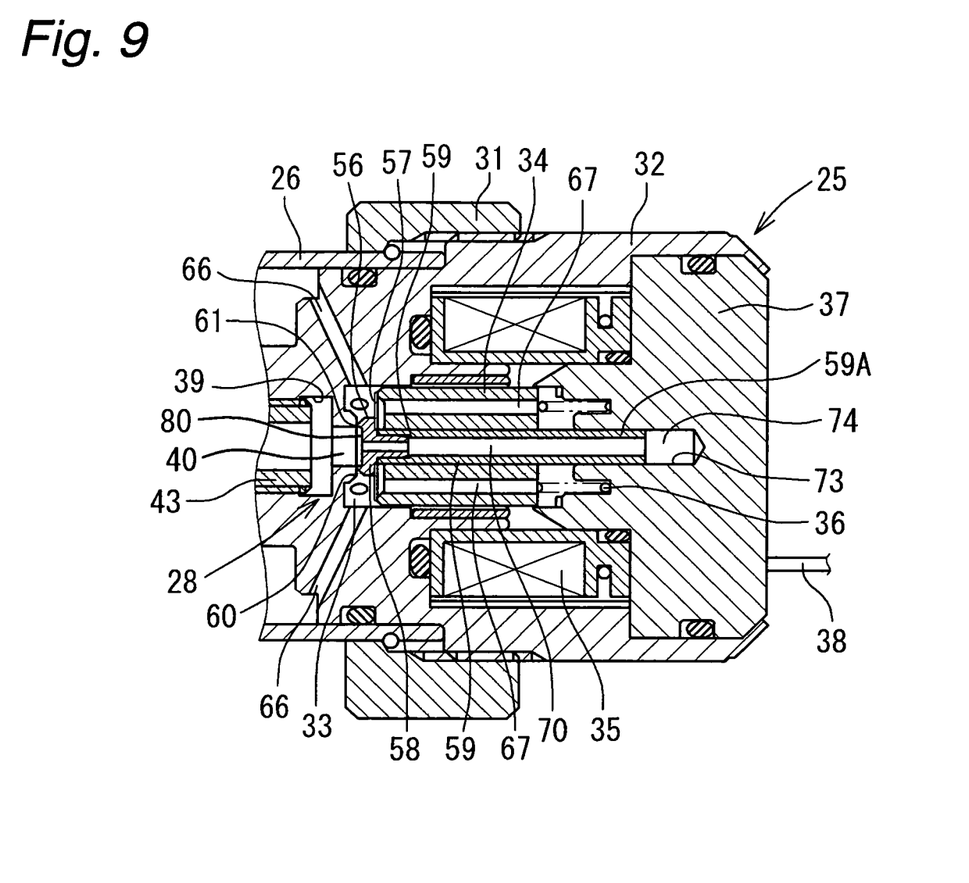
FIG. 9 is an expanded vertical cross-sectional view illustrating a pressure control valve according to still another variation of the second embodiment of the present invention.

A difference between the variation shown in FIG. 8 and the second embodiment is that, in the variation of FIG. 8, the guide pin 71 is omitted, and instead, a shaft portion 59A of a valve body is extended, and the extended portion 59 protrudes from the rear of a plunger 34 and is slidably and liquid-tightly inserted in a guide bore 73. A valve body back-pressure chamber 74 is defined in the guide bore 73 by the extended portion 59A of the shaft portion 59. As a result, the port 40 and the valve body back-pressure chamber 74 are directly in communication with each other through a valve body communication passage 70, whereby leak from the sliding portion can be prevented. In this case, as shown in FIG. 9, the valve body 56 may be formed by coupling a head portion and a shaft portion prepared as separate components, whereby a pipe material can be used as the shaft portion 59 so that the manufacturing cost can be reduced. The guide member 75 shown in FIG. 7 may be used in the variations shown in FIGS. 8 and 9.

Figure 10:
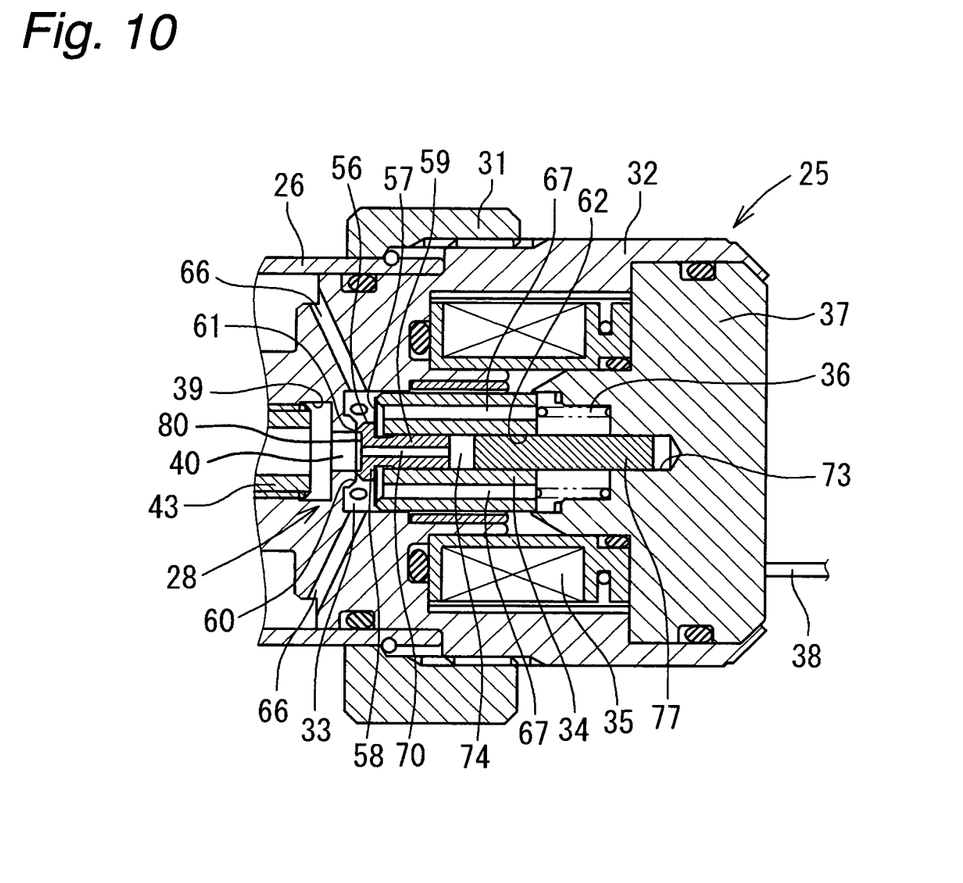
FIG. 10 is an expanded vertical cross-sectional view illustrating a pressure control valve according to still another variation of the second embodiment of the present invention.

A difference between the variation shown in FIG. 10 and the second embodiment shown in FIG. 5 is that, in the variation of FIG. 10, the guide pin 71 including the communication passage 72 is replaced with a solid guide pin 77. The guide pin 77 is press-fittedly fixed in a guide bore 73 of a core 37, and is slidably and liquid-tightly inserted in a guide bore 62 of a plunger 34. As a result, a valve body back-pressure chamber 74 is defined in the guide bore 62 of the plunger 34, and is in communication with a port 40 through a valve body communication passage 70. In this case, an axially extending passage similar to the communication bore 72 of the guide pin 77 shown in FIG. 5 may be formed through the guide pin 77 so that the valve body back-pressure chamber 74 is in communication with the guide bore 73 of the core 37, whereby the volume of the valve body back-pressure chamber 74 can be increased.

Figure 11:
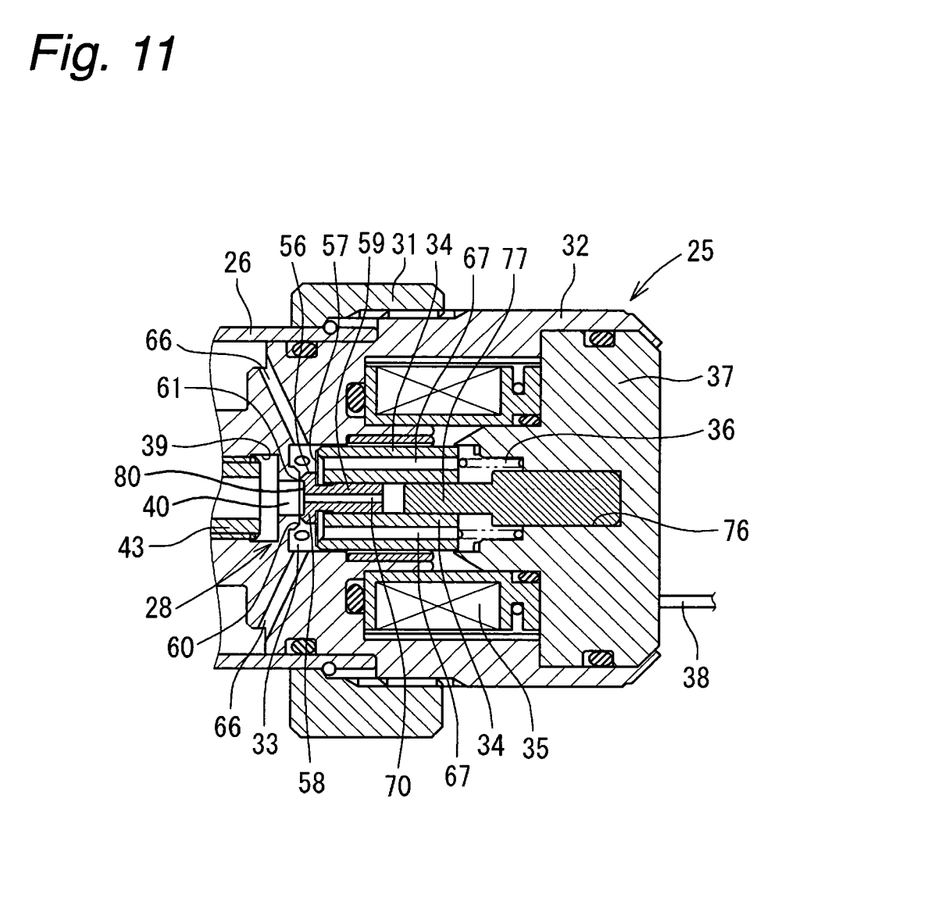
FIG. 11 is an expanded vertical cross-sectional view illustrating a pressure control valve according to still another variation of the second embodiment of the present invention.

As shown in FIG. 11, the guide pin 77 may be inserted in an attachment hole 76 formed in the core 37, instead of being press-fitted in the guide bore 73, and may be axially fixed by abutment of the end of the guide pin 77 against the bottom of the attachment hole 76. As a result, the requirement for concentric precision between the guide pin 77 and the core 37 side can be relaxed.

Figure 14:
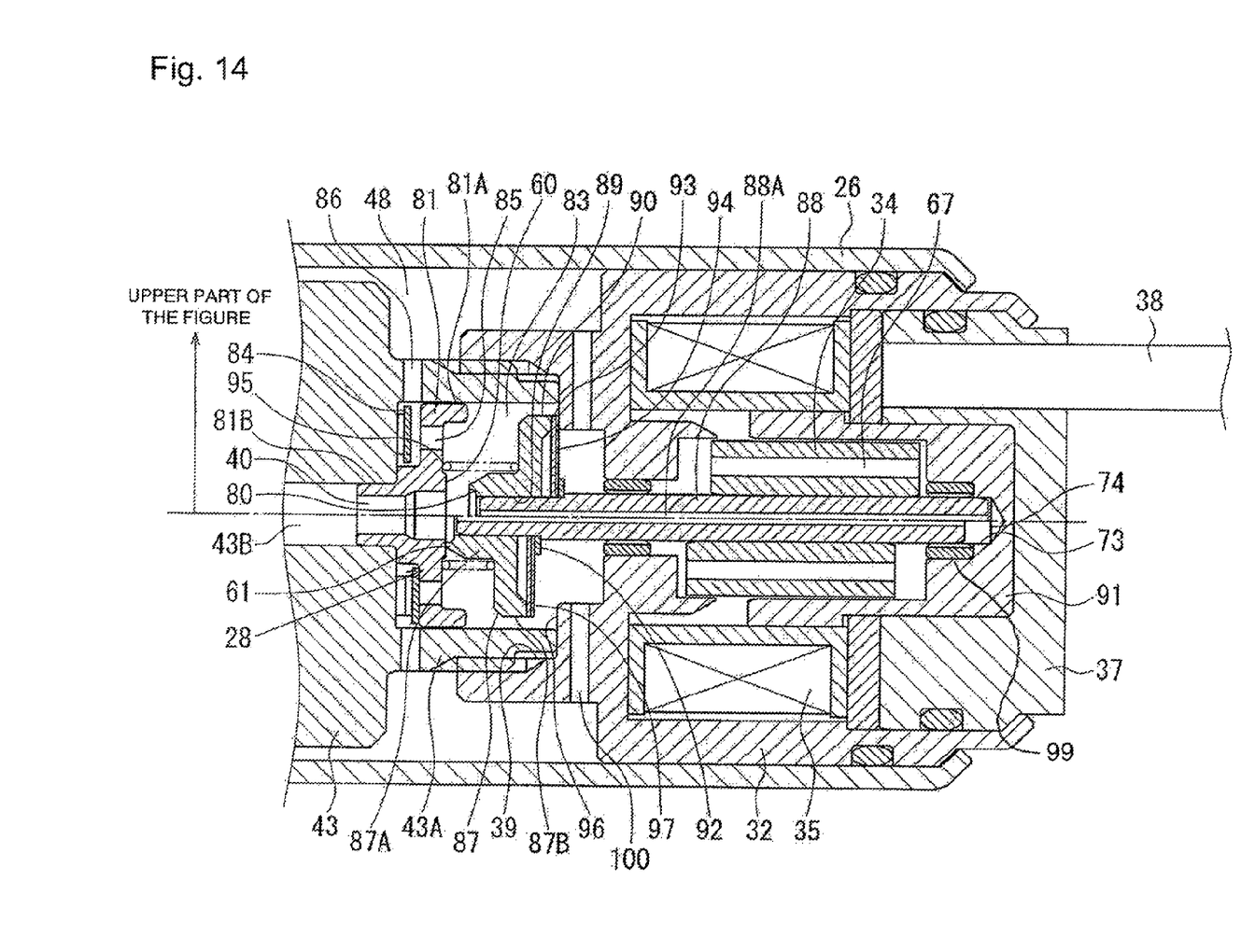
FIG. 14 is an expanded vertical cross-sectional view illustrating a pressure control valve of a damping force generating mechanism of a damping force adjustable hydraulic shock absorber according to a third embodiment of the present invention.

A third embodiment of the present invention will now be described with reference to FIG. 14. In the following description, like components are denoted by like reference numerals as of the second embodiment, and only components and features different or absent from the second embodiment will be described in detail. It should be noted that the upper half part of FIG. 14 shows a relief valve 84, a valve body 87, a rod 88, a plunger 34 and others when an electric current is not applied to a solenoid, while the lower half part of FIG. 14 shows them when an electric current is applied to the solenoid so that the valve body 87 is seated on a seat surface 60.

In the present embodiment, a passage bore 39 of a solenoid case 32 and a cylindrical portion 43A of a passage member 43 screwed in the passage bore 39 each have a large diameter. A stepped cylindrical port member 81 comprises a large diameter portion 81A and a small diameter portion 81B. The large diameter portion 81A of the stepped cylindrical port member 81 is inserted in the cylindrical portion 43A. A port 40 and the seat surface 60 are formed at the port member 81. The small diameter portion 81B is inserted in a passage 43B which is in communication with a second oil passage 86 extending radially through the passage member 43, and a fixed orifice 47, whereby the port 40 is in communication with the radially extending oil passage 86 and the fixed orifice 47. A valve chamber 83 is defined on the downstream of the port 40 in the passage bore 39 and the cylindrical portion 43A, and is in communication with a chamber 48 through a first oil passage 100 of the solenoid case 32. The relief valve 84 is disposed between the port member 81 and the passage member 43. The valve chamber 83 and the chamber 48 are in communication with each other via an oil passage 85 formed through the port member 81, the relief valve 84, and the second oil passage 86 formed through the cylindrical portion 43A. The relief valve 84 opens when a pressure in the valve chamber 83 reaches a predetermined valve-opening pressure so that the pressure in the valve chamber 83 is relieved into the chamber 48 side. When an electric current is applied to a coil 35, a seat portion 61 of the valve body 87 is spaced apart from the seat surface 60, and the valve body 87 is spaced apart from both of the seat surface 60 and a stepped portion 96. When the valve body 87 is in this state, the chamber 83 is mainly in communication with the chamber 48 via the first oil passage 100 of the solenoid case 32, while the chamber 83 is hardly in communication with the second oil passage 86 due to the presence of the release valve 84. On the other hand, when an electric current is not applied to the coil 35, the seat member 93 abuts against the stepped portion 96, and therefore closes the first oil passage 100, whereby the chamber 83 is in communication with the chamber 48 only through the second oil passage 86.

The substantially convex valve body 87 comprising a small diameter portion 87A and a large diameter portion 87B is disposed in the valve chamber 83. The front end of the hollow rod 88 attached to the plunger 34 is inserted in the valve body 87. The annular seat portion 61 is formed in a protruding manner at the tip of the small diameter portion 87A of the valve body 87. The annular seat portion 61 moves away from and is seated on the seat surface 60 of the port member 81. The port 40 and the valve body 87 constitute a pressure control valve 28. As in the above-mentioned second embodiment, a concave portion 80 is formed adjacent the inner circumferential portion of the seat portion 61, and the outer circumferential side of the seat portion 61 is formed in a tapering manner. As a result, it is possible to bring about several advantageous effects such as a decrease in influence of a fluid force, achievement of a sufficiently small soft-side damping force, and performing of a stable damping force control. An axially extending opening 89 is formed in the valve body 87, and the end of the rod 88 is slidably and liquid-tightly inserted in the opening 89. An annular abutment portion 90 is formed in a protruding manner along the outer circumferential edge of the end surface of the large diameter portion 87B of the valve body 87.

The rod 88 extends through and is fixed to the plunger 34. The rear end of the rod 88 is slidably and liquid-tightly inserted in a guide bore 73 through a bearing 99. The guide bore 73 is formed at the bottom of a bottomed cylindrical guide member 91 for guiding the rear end of the plunger 34 through the bearing, whereby a valve body back-pressure chamber 74 is formed in the guide bore 73. The valve body back-pressure chamber 74 is in communication with the concave portion 80 of the valve body 87 via a communication passage 88A through the hollow rod 88.

A retaining ring 92 is fixed to a stepped portion formed on the front end side of the rod 88. An annular seat member 93 and a valve spring 94 (leaf spring) are disposed between the retaining ring 92 and the abutment portion 90 of the valve body 87. The outer circumferential portions of the seat member 93 and the valve spring 94 abut against the abutment portion 90, and the inner circumferential portions thereof abut against the retaining ring 92. Upon application of an electrical current to the coil 35, a thrust force of the plunger 34 is generated, and as shown in the lower half portion of FIG. 4, the valve body 87 is pushed by the thrust force of the plunger 34 against the spring force of a return spring 95 so that the seat portion 61 is pressed against the seat surface 60. At this time, the valve body 87 is elastically supported by the rod 88 through the valve spring 94. The return spring 95 (coil spring) as a main spring is disposed between the port member 81 and the valve body 87. The stepped portion 96 is formed on the bottom side of the passage bore 39 at a position facing the abutment portion 90 of the valve body 87. When an electric current is not applied to the coil 35, as shown in the upper half part of FIG. 14, the valve body 87 is retreated by the spring force of the return spring 95, and the seat member 93 abuts against the stepped portion 96, so that the valve chamber 83 and the chamber 48 are in communication with each other only through an orifice 97 formed at the seat member 93. The spring stiffness of the valve spring 94 is larger than that of the return spring 95, and the mass of the valve body 87 is sufficiently smaller than that of the plunger 34.

As a result, the pressure control valve 28 functions as shown in the lower half part of FIG. 14. Application of an electric current to the coil 35 causes the valve body 87 to be pushed by the thrust force of the plunger 34 against the spring force of the return spring 95, so that the seat portion 61 is pressed against the seat surface 60 and the valve-opening pressure is adjusted. At this time, as in the above-mentioned first and second embodiments, if the pressure in the port 40 suddenly increases, the valve spring 94 is deflected and therefore only the lightweight valve body 87 is retread so that the valve opens. After that, the plunger 34 is retreated according to a retreat movement of the valve body 87. Therefore, it is possible to reduce the possibility of response delay which otherwise could occur due to the inertia of the plunger 34, and it is possible to perform an appropriate damping force control by preventing the overshoot phenomenon. An excessive increase in the pressure in the back-pressure chamber 53 can be prevented which otherwise could occur due to delay of valve opening of the pressure control valve 28, and a stable damping force control can be performed. In addition, generation of abnormal noises and destabilization of a damping force due to self-excited vibration of the valve body 87 can be prevented.

Further, as in the above-mentioned second embodiment, when the pressure control valve 28 is closed, i.e., when the seat portion 61 of the valve body 87 is seated on the seat surface 60, the valve body back-pressure chamber 74 is in communication with the port 40 through the communication passage 88A of the rod 88. Therefore, the pressure-receiving area of the valve body 87 to the port 40 is the area resulting from subtraction of the cross-section area of the rod 88 from the area of the inner side of the seat portion 61. As a result, in the valve body 87, it is possible to adjust the pressure-receiving area to the port 40 by adjusting not only the diameter of the seat portion 61 but also the diameter of the rod 88. Therefore, flexibility of setting of the valve-opening characteristics of the pressure control valve 28, and therefore flexibility of setting of the damping force characteristics of the damping force generating mechanism 25 can be enhanced.

When the thrust force of the plunger 34 is eliminated due to occurrence of a fail such as a failure of a controller or disconnection of the coil 35, as shown in the upper half part of FIG. 14, the valve body 87 is retreated by the spring force of the return spring 95 so that the seat member 93 abuts against the stepped portion 96 of the communication bore 39 to close the first oil passage 100, and the valve chamber 83 and the chamber 48 are in communication with each other through the orifice 97. When the pressure in the valve chamber 83 increases due to, for example, speed-up of the piston speed, and reaches the valve-opening pressure of the relief valve 84, the relief valve 84 opens, and the pressure in the valve chamber 83 is relieved into the chamber 48.

As a result, a damping force is generated according to the flow passage area of the orifice 97 and the relief pressure of the relief valve 84, and the pressure in the back-pressure chamber 53, i.e., the valve-opening pressure of the disk valve 51 is adjusted. Therefore, even when a fail occurs, an appropriate damping force can be generated by appropriately setting the flow passage area and the relief pressure. As shown in FIG. 13, as a result of broadening the adjustable range of the damping force characteristics, even when a hard-side damping force is significantly large, upon occurrence of a fail, an appropriate damping force can be generated not by the hard characteristics but by the orifice 97 and the relief valve 84. For example, when a fail occurs, a damping force of the medium characteristics between the hard and the soft may be generated so that influence of the fail to the vehicle can be reduced.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2008-093351, filed on Mar. 31, 2008, Japanese Patent Application No. 2008-116213, filed on Apr. 25, 2008, and Japanese Patent Application No. 2009-040780, filed on Feb. 24, 2009. The entire disclosure of Japanese Patent Applications Nos. 2008-093351, 2008-116213 and 2009-040780 including specification, claims, drawings and summary is incorporated herein by reference in its entirety.

Japanese Patent Application Public Disclosure No. 2001-012534, Japanese Patent Application Public Disclosure No. H07-259918, and Japanese Patent Application Public Disclosure No. H11-287281 are incorporated herein by reference in their entirety.

What is claimed is:

1. A damping force adjustable shock absorber, comprising:
 a cylinder sealingly containing fluid;
 a piston slidably fitted in the cylinder;
 a piston rod having one end coupled with the piston and the other end extending outside of the cylinder; and
 a pressure control valve operable to generate a damping force by controlling a fluid flow generated by a sliding movement of the piston in the cylinder, the pressure control valve having an adjustable valve-opening pressure,
 wherein the pressure control valve comprises:
 a valve body configured to be seated on a seat surface;
 a plunger;
 a shaft portion provided to the valve body and including an axially extending communication passage within the shaft portion, the shaft portion being inserted into and fixed to the plunger, wherein the plunger adjusts the valve-opening pressure by applying a thrust force by the plunger on the valve body so that the valve body is moved toward the seat surface;

a solenoid for adjusting the thrust force of the plunger;

a bottomed cylindrical guide member for guiding the plunger;

a guide bore formed through the guide member at a bottom of the guide member, the shaft portion being inserted into the guide bore through a bearing;

a valve body back-pressure chamber formed with the bearing, the guide bore, and a back surface of the shaft portion, and acting on the valve body in a direction in which the valve body is moved toward the seat surface; and a main spring for urging the plunger or the valve body in a direction opposite from the direction in which the thrust force is applied by the plunger, wherein the damping force adjustable shock absorber further comprises a main valve operable to generate a damping force by controlling a fluid flow generated by sliding movement of the piston in the cylinder, and a main valve back-pressure chamber having an inner pressure acting on the main valve in a valve-closing direction, wherein a part of the fluid flow is introduced into the main valve back-pressure chamber, and valve opening of the main valve is controlled by adjusting the inner pressure of the main valve back-pressure chamber by the pressure control valve, wherein a plunger passage is formed through the plunger for communicating chambers, formed at opposite ends of the plunger, with each other to balance the pressures therein, and wherein a pressure-receiving area of the valve body is a pressure-receiving area obtained by subtracting a cross-sectional area of the shaft portion of the valve body back-pressure chamber side from an area of a portion inside of an annular seat portion of the valve body that moves away from and seats on the seat surface, in the condition when the valve body seats on the seat surface and the valve body back-pressure chamber is in communication with the main valve back-pressure chamber through the communication passage of the shaft portion.

2. The damping force adjustable shock absorber according to claim 1, wherein the valve body is slidably guided by the plunger along the axial direction of the plunger.

3. The damping force adjustable shock absorber according to claim 1, wherein the shaft portion provided to the valve body is a different member from the valve body, and is slidably guided in a guide bore penetratingly formed through a center of the plunger, along an axial direction of the guide bore.

4. The damping force adjustable shock absorber according to claim 1, wherein the valve body includes a concave portion formed adjacent an inner circumferential portion of the seat portion.

5. The damping force adjustable shock absorber according to claim 1, further comprising a fixed orifice for introducing fluid from an upstream side of the main valve to a main valve back-pressure chamber side, wherein the inner pressure of the main valve back-pressure chamber is adjusted by controlling the pressure control valve so that opening and closing of the main valve is controlled.

6. The damping force adjustable shock absorber according to claim 5, wherein the valve body back-pressure chamber is formed outside the plunger.

7. The damping force adjustable shock absorber according to claim 1, wherein the main spring urges the valve body in a valve-opening direction.

8. The damping force adjustable shock absorber according to claim 7, wherein, in the pressure control valve, when a fail occurs, the valve body moves in the valve-opening direction by being urged by the main spring so as to close a first flow passage to a downstream side to allow fluid flow through a second flow passage.

9. The damping force adjustable shock absorber according to claim 8, wherein a relief valve is disposed in the second flow passage.

10. The damping force adjustable shock absorber according to claim 1, wherein the pressure control valve is disposed at a lateral portion of the cylinder.

11. The damping force adjustable shock absorber according to claim 3, wherein the valve body is urged by the main spring in a direction in which the shaft portion extends away from the valve body.

* * * * *